US008695019B2

(12) United States Patent (10) Patent No.: US 8,695,019 B2
Sandland et al. (45) Date of Patent: Apr. 8, 2014

(54) SYSTEM AND METHOD FOR DELIVERING EXTERNAL DATA TO A PROCESS RUNNING ON A VIRTUAL MACHINE

(75) Inventors: Carl Sandland, Braddon (AU); Matthew Patrick Herscovitch, Chapman (AU); Timothy Brian Dingwall, Waniassa (AU)

(73) Assignee: Actividentity (Australia) Pty Ltd, Australian Capitory Terr. (AU)

( * ) Notice: Subject to any disclaimer, the term of this patent is extended or adjusted under 35 U.S.C. 154(b) by 78 days.

(21) Appl. No.: 11/005,895

(22) Filed: Dec. 7, 2004

(65) Prior Publication Data

US 2005/0198488 A1 Sep. 8, 2005

Related U.S. Application Data

(63) Continuation-in-part of application No. 13/369,268, filed on Feb. 14, 2003.

(30) Foreign Application Priority Data

Dec. 11, 2003 (AU) ................................ 2003906851

(51) Int. Cl.
*G06F 9/44* (2006.01)
*G06F 9/455* (2006.01)
*G06F 15/16* (2006.01)
(52) U.S. Cl.
USPC .................... 719/328; 718/1; 719/318; 726/8
(58) Field of Classification Search
USPC ............. 709/201–207, 217–219; 715/501.1, 715/513, 736–749, 760–763; 718/1; 719/311, 328, 318; 726/2–8, 27–30, 726/26; 713/155–185
See application file for complete search history.

(56) References Cited

U.S. PATENT DOCUMENTS

| 5,935,251 A | * | 8/1999 | Moore ........................... 726/18 |
| 6,065,024 A | * | 5/2000 | Renshaw ...................... 715/234 |
| 6,766,454 B1 | * | 7/2004 | Riggins ......................... 713/185 |
| 7,222,361 B2 | * | 5/2007 | Kemper ........................... 726/4 |
| 7,523,191 B1 | * | 4/2009 | Thomas et al. ................ 709/224 |
| 2002/0165993 A1 | * | 11/2002 | Kramer ......................... 709/315 |
| 2004/0061714 A1 | * | 4/2004 | Sinclair et al. ................ 345/705 |
| 2004/0088438 A1 | * | 5/2004 | Madril et al. .................. 709/250 |

FOREIGN PATENT DOCUMENTS

WO 2004/049750 8/2004

OTHER PUBLICATIONS

Stephanidis "Designing for all in the Information Society: Challenges towards universal access in the information age" ERCIM ICST Research Report Nov. 1999, pp. 1-38.*

* cited by examiner

*Primary Examiner* — Charles E Anya
(74) *Attorney, Agent, or Firm* — Muirhead and Saturnelli, LLC (57) ABSTRACT

In a computer system including a computer terminal, an operating system installed on said computer terminal, a virtual machine running on the operating system, a server communicatively coupled to the computer terminal and a process including instructions that when executed on a virtual machine define a user interface; a Single Sign On (SSO) system comprising a database of authentication credentials accessible to the computer terminal, and instructions executable on the virtual machine operative to: obtain user interface state data from the process; query the virtual machine to obtain component data related to the user interface state data; and manipulate the component data so as to deliver authentication credentials to the process.

13 Claims, 7 Drawing Sheets

Figure 1

PRIOR ART

SYSTEM AND METHOD FOR DELIVERING EXTERNAL DATA TO A PROCESS RUNNING ON A VIRTUAL MACHINE

CROSS-REFERENCE TO RELATED APPLICATIONS

This application is a continuation-in-part of U.S. Ser. No. 10/369,268 filed by the present applicants on Feb. 14, 2003. The present application is also related to Australian Provisional Patent Application No. 2003906851 filed by the assignee on Dec. 11, 2003; the disclosure of which is hereby incorporated in its entirety.

BACKGROUND OF THE INVENTION

1. Field of the Invention

The present invention relates to a system and method for communicating with a process running on a virtual machine. By way of illustrative example of a preferred embodiment of the present invention reference will be made to a single sign-on system that passes user credentials to a Java applet running on a Java Virtual Machine. It is to be understood however that the present invention is applicable for communicating with a process running on a virtual machine in contexts other than single sign on applications.

It is also to be understood that the term "process" it to be understood as having a broad meaning encompassing any executable computer code or data, whether compiled or interpreted, including but not limited to threads, procedures, scripts and programs.

2. Discussion of the Related Art

When computers were first deployed, such as in a work environment, there was generally a single computer, (such as mainframe or minicomputer) shared by a number of users, who accessed the computer via "dumb" terminals. A user would authenticate their identity when logging in by entering a user name and password into their terminal and thereby gaining access to the resources (ie. programs and data) of the computer. Since there was only a single computer, the authentication process only had to be performed once per user session.

With the establishment of local area networks linking PCs and/or workstations, minicomputers and mainframes, users often had to authenticate themselves to their own workstation to gain initial access to the network, and then separately to each network node on which a required resource resided. However, the maximum number of nodes on local area networks was fairly constrained, meaning that the number of different log-in names and passwords that a user needed to know was manageable.

Figure 1:
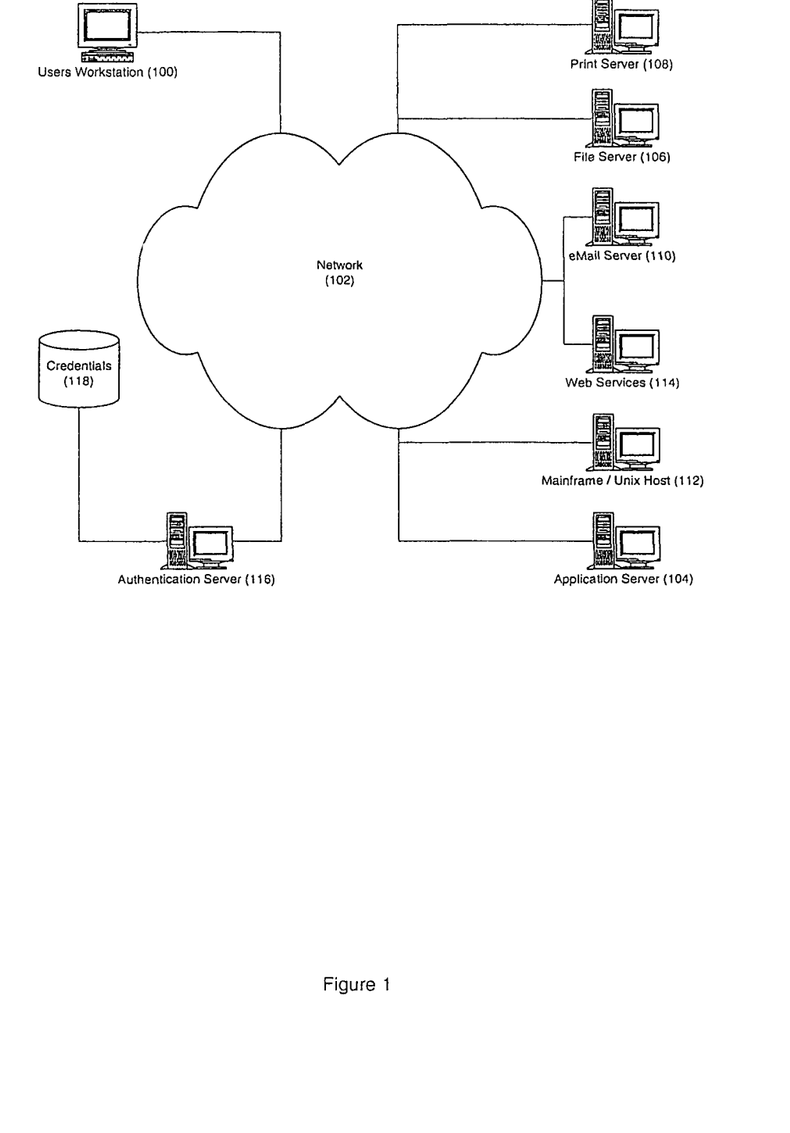
FIG. 1 is a block diagram illustrating the resources available to a user workstation via network connectivity as occurs in the prior art.

Most local area networks are now connected to wide area networks and principally the Internet. With Internet connectivity users have access to effectively limitless resources residing on globally dispersed network nodes. For example, as illustrated in FIG. 1, a user workstation 100, such as a PC, is connected to a network 102. Typically the workstation 100 is connected to a local area network (LAN). In turn, the LAN is connected via an Internet Service Provider (ISP) (not shown) to a router (not shown) that provides access to the Internet. The LAN may also be connected via the telephone system to other LANs to form extranets. The network 102 illustrated in FIG. 1, refers to LANs (including extranets), wide area networks and the Internet.

Network connectivity allows user access to resources residing on an Application Server 104 that runs applications for the user and delivers output to the user workstation 100. Applications may also run directly on the user workstation and have access to file servers 106, print servers 108 and email servers 110 residing on the LAN or on other networks including the Internet.

The user workstation 100 also has access to resources on a mainframe/Unix Host 112 that are accessed via terminal emulator software, using a protocol such as TN 3270, running on the user workstation. Network connectivity also allows access to any number of services 114 available on the World Wide Web, such as internet banking, online auctions, online retailers, commercial databases (such as Lexis or Dialog) and web mail Potentially, a user may have to authenticate themselves each time they wish to access a particular resource, meaning that a large volume of authentication credentials (such as user names, and passwords) need to be remembered. Additionally, for security purposes, many services require that a password be changed on a regular basis, thus adding to the confusion and difficulty in managing authentication credentials.

In an attempt to better manage authentication of user credentials Single Sign On (SSO) systems have been developed. SSO allows automation of the authentication process, whereby users authenticate themselves once, with the SSO system then managing subsequent authentications if and when required. In some cases, SSO is provided by an authentication server 116, accessible to the user work station 100 over the network 102. Alternatively, the SSO system can run directly on the user workstation 100 or on both the workstation 100 and server 116. A database (such as an X.500 based Directory) of authentication credentials 118 is accessible to the SSO system. For security purposes the authentication credentials are stored in encrypted form.

Figure 2:
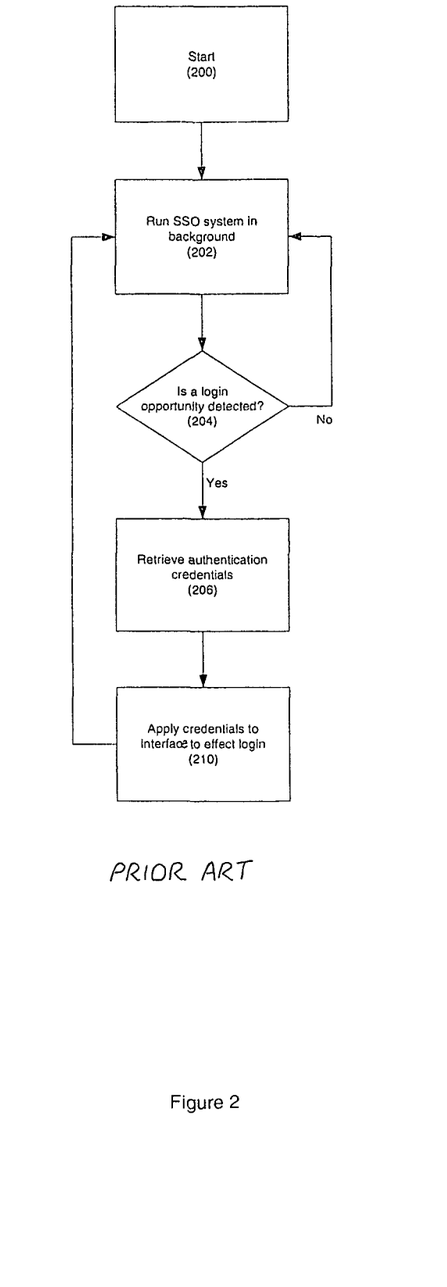
FIG. 2 is a flow chart illustrating the operation of an SSO system as occurs in one example of the related art.

An overview of an SSO system is given by reference to FIG. 2. Generally, the SSO system runs as a background process on the user workstation 100 in step 202. At step 204, data that is indicative of the state of a user interface (hereinafter referred to as "user interface state data") presented on the user workstation is examined to detect whether there is a log-in opportunity. This step is typically implemented via services provided by the operating system as understood by those skilled in the art. For example the Windows operating system provides application programming interfaces (APIs) that allow an application to be notified of various user interface events. This mechanism, known as "Windows hooking", allows the application to determine when a window is created, what the window contains and properties of the window such as its title, position and others.

After detecting a log-in opportunity at step 206, the SSO system determines the particular resource related to the log-in opportunity (such as application, mainframe, web service etc) and retrieves the relevant authentication credentials from the database 118. These credentials are then applied at step 210 to the user interface object, such as by entering the user name and password to thereby complete the authentication process. The user is thus relieved from having to remember and enter the correct user name and password to access a particular resource.

Figure 3:
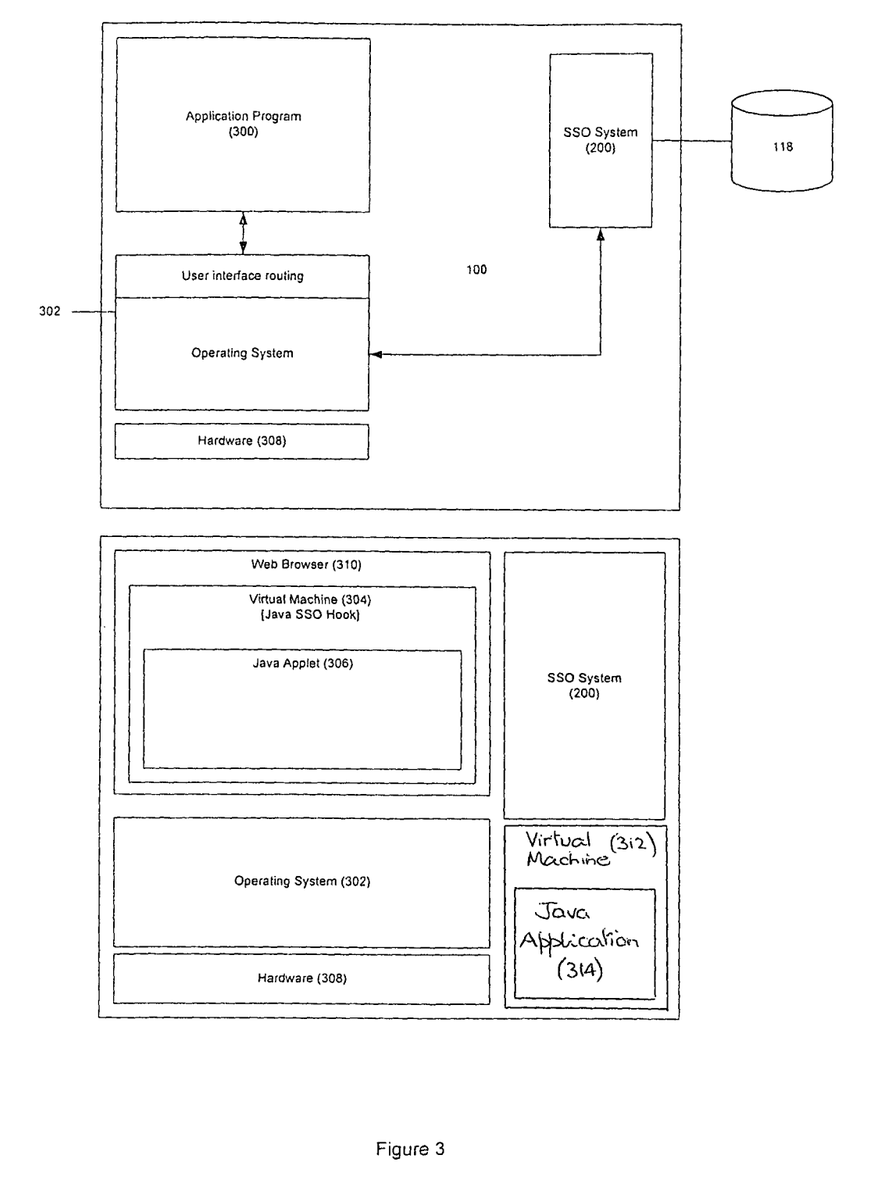
FIG. 3 is a block diagram illustrating an application program running on an operating system, a Java applet running on a Virtual Machine inside a Web Browser and a Java application running on a standalone Virtual Machine.

The resources accessed by the SSO system may exist on the user workstation 100 as an application program, as is illustrated in FIG. 3. In this case, an application program 300 (for example a terminal emulator or email client) uses operating system 302 services such as a user interface 304 to perform its tasks. The SSO system 200 is also an application program that, as noted above, uses operating system services to authenticate the user to particular resources.

However, some resources do not exist as an application program running directly on the operating system 302, but rather as a process running on a virtual machine 304. A virtual machine can be described as a software simulated machine providing the operational equivalent of a real machine that does not exist as a physical entity per se. A virtual machine 304 takes instructions from a process 306 and converts them to instructions that are recognisable by the operating system 302 and hardware 308 on which the virtual machine 304 runs. The first virtual machine 304 hosts a Java applet 306, whilst a second virtual machine 312 may host a Java application 314.

Figure 4:
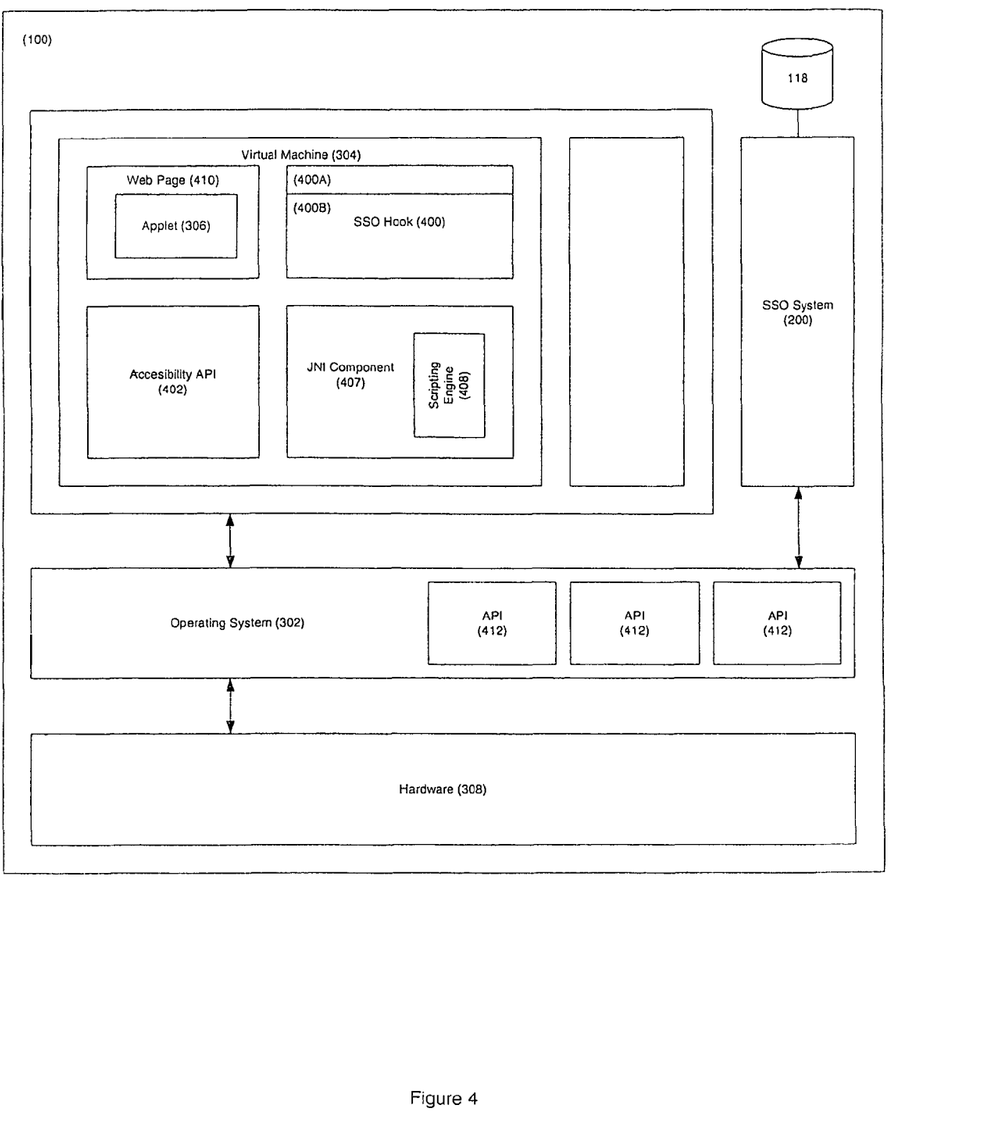
FIG. 4 is a block diagram illustrating the components of the software product of one embodiment of the present invention.

For example, as illustrated in FIG. 4 a web browser 310 such as Microsoft Internet Explorer exists as an application program running on an operating system 302 (such as Microsoft Windows), which in turn is running on particular hardware 308 (such as an Intel processor with memory and peripherals). The web browser 310 implements a virtual machine 304 on which processes may be run. In particular, a Java applet 306 delivered as part of a web page to the web browser 310 over the internet 102, exists as a process that runs on the virtual machine 304. For example the Java virtual machine (JVM) developed by Sun Microsystems, Inc.

The Java applet uses services provided by the virtual machine, to instructions recognisable by the operating system 302 and hardware 308 implementing the virtual machine 304. The Java programming language was developed by Sun Microsystems and has been successful due to its cross platform portability, in that a single Java program may be written for any platform that implements the JVM. Thus, the same applet may be written for and run on a platform employing, for example, the Microsoft Windows XP, Unix, Linux or Apple Macintosh OS series of operating systems, or indeed any platform that implements a JVM.

Numerous web based services provide authentication prompts, such as requests for user names and passwords via a Java applet that is downloaded to the user's browser and runs on a virtual machine. An effective SSO system would allow authentication to any resource, irrespective of how the resource exists on a user workstation 100. Whilst current SSO systems allow accurate authentication to a resource existing as an application program, they are less successful where the resource exists as a process running on a virtual machine.

Thus SSO systems could be improved to allow authentication into a virtual machine. Also, it would be advantageous to communicate with processes running on virtual machines for other purposes. One particular embodiment of the present invention, which employs the browser helper object (BHO) system to determine the source URL of a Java applet, is described in the applicant's co-pending U.S. patent application Ser. No. 10/369,268 filed 14 Feb. 2003 (Publication No. 2004/016087). Improvements and simplifications to the program code and method of the earlier embodiment have been undertaken to deliver enhanced reliability of operation, as described and illustrated herein.

SUMMARY OF THE INVENTION

Object of the Invention

The present invention aims to provide an alternative to known software products and methods of the type referred to above. More particularly, the invention aims to provide an improved computer software product and method that allows communication with a process running on a virtual machine.

Disclosure of the Invention

According to a first aspect of the present invention there is provided a method for delivering external data to a process running on a virtual machine, said virtual machine running on an operating system, the method comprising the steps of:

executing instructions on the virtual machine that obtain state data related to the process;
 querying the virtual machine to obtain component data related to the state data; and
 manipulating the component data to deliver the external data to the process.

Typically the process implements a user interface and the state data is user interface state data. The user interface is generally a graphical user interface (GUI) and the user interface state data preferably indicates the creation of a top level window in the GUI.

Optionally the instructions utilise an applications program interface (API) running on the virtual machine to obtain the state data. It has been found that an accessibility API is a suitable API and that the state data may be obtained by using an accessibility API to hook the virtual machine process.

The process may for example be an applet or an application.

The process may call out to an external process to retrieve information, such as a login script or authentication credentials. Preferably, in order to retrieve the correct information, the code running within the virtual machine determines a unique identifier for itself.

The unique identifier for identifying the application running in the virtual machine may be selected from one of:

the class name of top level window,
 the thread group of the top level window,
 the textual information provided by the accessibility API about the top level window, and
 the title of the top level window.

Suitably in the case of the Java accessibility API, the name of the top level window in an application can be retrieved as an AccessibleName.

According to a second aspect of the present invention there is provided computer readable media carrying program code for carrying out the method of the first aspect of the invention set out hereinabove.

According to a third aspect of the present invention there is provided, in a computer system including a computer terminal, an operating system installed on said computer terminal, a virtual machine running on the operating system, a server communicatively coupled to the computer terminal and a process including instructions that when executed on a virtual machine define a user interface;

a Single Sign On (SSO) system comprising:
 a database of authentication credentials accessible to the computer terminal
 instructions executable on the virtual machine, which instructions are operative to:
  obtain user interface state data from the process;
  query the virtual machine to obtain component data related to the user interface state data; and
  manipulate the component data so as to deliver authentication credentials to the process.

In one embodiment, wherein the process comprises a Java applet stored at the server, the applet includes said instructions to define a user interface, and the system further includes a browser installed on said computer terminal operative to download the Java applet from the server and run the Java applet on the virtual machine.

In an alternative embodiment, wherein the process comprises a Java application, the application includes said instructions to define a user interface.

The software product method and system of the present invention allows communication with a process running on a virtual machine and can be used to implement an SSO system. In addition the present invention could be utilised in any situation where communication with virtual machine processes is required, such as for testing software code written to be executed on a virtual machine.

BRIEF DETAILS OF THE DRAWINGS

In order that this invention may be more readily understood and put into practical effect, reference will now be made to the accompanying drawings illustrate preferred embodiments of the invention, and wherein.

DESCRIPTION OF THE PREFERRED EMBODIMENTS

Turning to FIGS. 3 and 4, there is illustrated the user workstation 100, which is a PC having conventional hardware 308, on which an Operating System 302, such as Microsoft Windows is running. Two application programs, being a web browser 310 and an SSO system 200 are running on the Operating System 302. A virtual machine 304 such as the JVM is implemented within the web browser 310 that allows a Java applet 306, downloaded from the Internet with a web page 410 to run on the user workstation. The applet 306 is written in the Java programming language and uses services provided by the virtual machine to perform its tasks and actually runs on the virtual machine 304 as a thread inside the browser process 310. The program instructions of the applet will be converted by the virtual machine 304 into instructions that can be executed by the operating system 302. The conversion process, however, is hidden from the applet 306 that needs only to call services that are provided by the virtual machine. In turn, the operating system 302 implements the necessary routines from the hardware 308 to execute the converted instructions.

The task of the applet 306 in this example is to request the entry of a user name and password from the user of the workstation 100, to allow the user access to resources provided at the web server from which the web page 410 was obtained. To accomplish this task, a user interface object such as a window with text entry boxes to receive a user name and password must be created in a graphical user interface. Application programs running on the operating system 302 utilise APIs 412 provided by the operating system 302 to create such objects. In the case of Microsoft's 32 bit Windows Operating Systems the relevant APIs are known as "Win32" and application programs that rely on these APIs are known as Win32 applications. Also, as was noted above, the operating system 302 may also provide APIs that allow an application program to be notified of user interface events, such as the creation of a window in the graphical user interface (GUI).

However, in recent Java graphical user interface (GUI) frameworks only the browser 310 window that contains the top level Java window ("the applet frame window") is a Win32 window, with other user interface objects appearing to the operating system as a privately managed screen area. Thus where a window, other than an applet frame window, is created by the Java applet 306 running inside the virtual machine 304, data that is indicative of the state of a user interface (the "user interface state data"), except for title of the Window, is not accessible to application programs, including the SSO system 200. It is for this reason that current SSO systems are not suited to authenticating users to services that exist as processes running on a virtual machine.

To provide access to this user interface state data, an Accessibility API 402 also runs on the virtual machine 304. An example of an Accessibility API that is suitable for implementing the present invention is the Java Accessibility API that was designed by Sun Microsystems, Inc. to allow third party applications and in particular those used by the disabled (for example Braille readers, speech synthesisers, image enlargers etc) to interact with Java applets. It has been surprisingly found that an Accessibility API provides access to crucial user interface state data that can be used by the SSO system 200 to pass data from a process running outside the virtual machine ("external data") into the applet.

The present invention works best with versions 6 and above of Microsoft's Internet Explorer having the Javasoft Runtime Environment ("JRE") plugin with Accessibility API installed. Accessibility should be appropriately enabled through the awt.properties and Accessibility.properties files pertaining to the appropriate JRE.

An SSO Hook 400, written in the Java programming language, also runs on the virtual machine 304 with the applet 306 and the Accessibility API 402. The SSO Hook 400 can be registered with the Accessibility API 402 to obtain state data relevant to the applet 306. Additionally the SSO Hook 400 also includes instructions for forwarding external data from the SSO System 200, to the applet 306 by manipulating the state data obtained from the Accessibility API 402.

Figure 5:
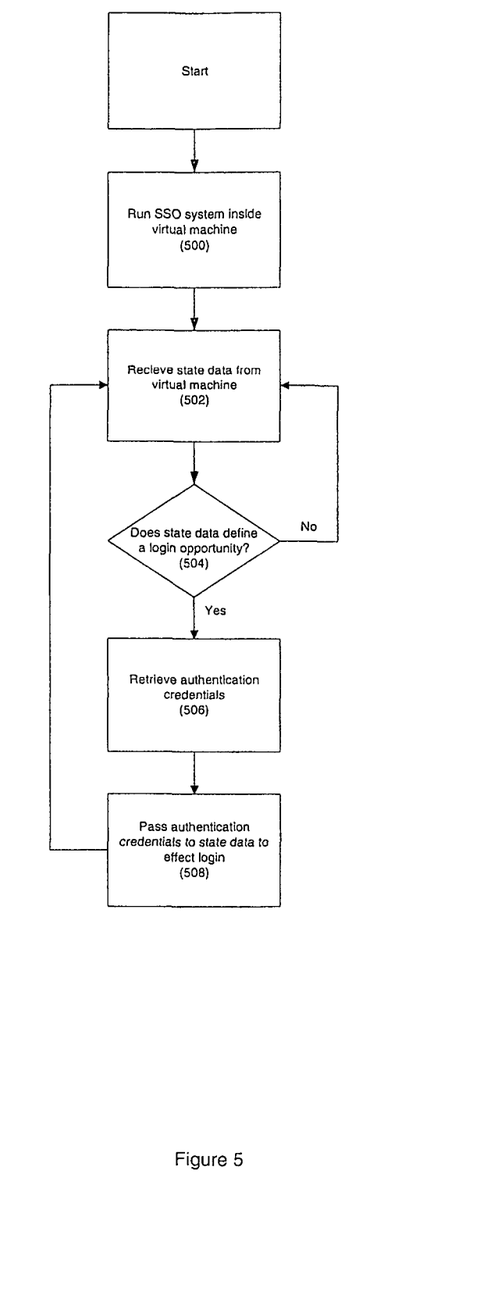
FIG. 5 is a flow chart illustrating a high level view of the process carried out by the software product of one embodiment of the present invention.

A high level view of the operation of the components of the invention described in FIG. 4 is given by reference to FIG. 5. At step 500, the SSO System 200 causes the SSO Hook 400 to execute on the virtual machine 304 as a background process. User Interface State Data is then received at step 504 and examined by the SSO Hook 400. At step 504 a test is carried out to determine whether the User Interface State Data defines a login opportunity related to the Java applet 306, running on the virtual machine 304. In the event that a login opportunity is defined the relevant authentication credentials are retrieved from the database 118 at step 506. These credentials are then applied to the Java applet in step 508 to effect the authentication.

Figure 6:
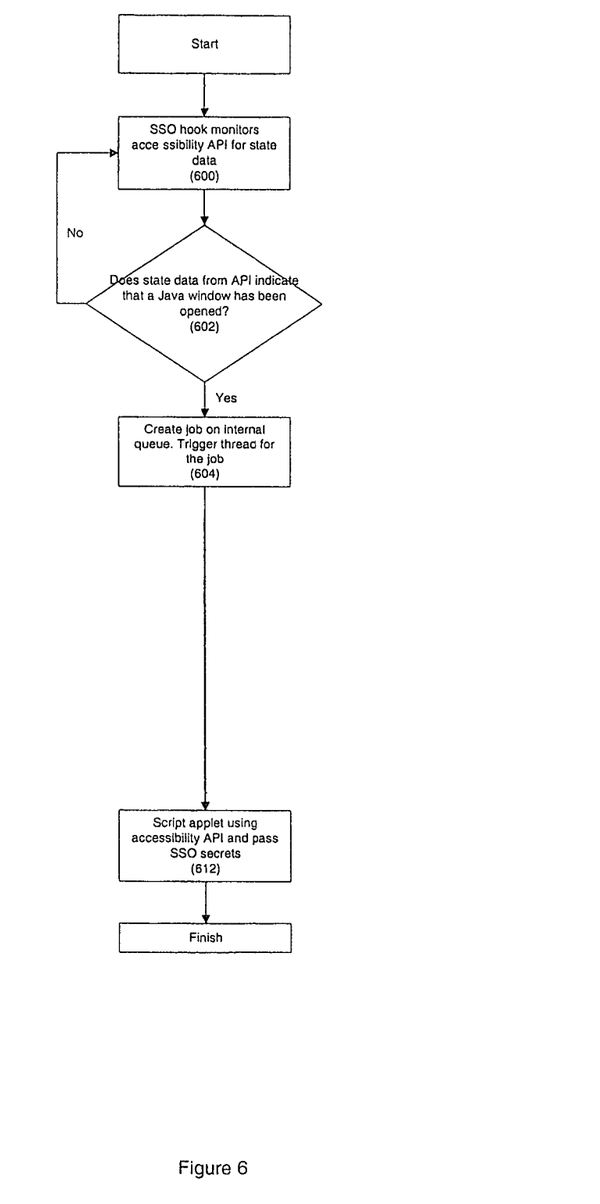
FIG. 6 is flow chart illustrating the process carried out by the SSO Hook in receiving user interface state data and calling the other components of the software product of the embodiment.

The initial stage of the process commences when the SSO Hook 400 executes on the virtual machine 304 and this stage is illustrated in more detail by reference to FIG. 6. At step 600, the SSO Hook 400 uses the Accessibility API to determine if there is any relevant user interface state data from the Java applet 306 running on the virtual machine 304. Specifically, the Accessibility API will notify the SSO Hook whenever a top level window (being the main window in the window hierarchy for the applet) is created by a Java applet. Although the creation of a top level Window is often discoverable using the standard Win32 hooking mechanisms only the title of the window is available to an application. This is not the case where an Accessibility API is used. Upon notification by the Accessibility API the SSO Hook 400 examines various attributes of the top level window discovered by the Accessibility API and other APIs including but not limited to its title, class, child windows and controls, thread group, and accessible name.

A test is performed at step 602 to determine whether the user interface state data received from the Accessibility API 402 indicates that a top level window has been created by the applet. In the event that such a window has been created a job is created on an internal queue and a thread is triggered for that job at step 604.

The attribute data is obtained by querying the thread group of the top level window, which includes the full URL that completely specifies the directory containing the main Class file of the applet 306. A correct URL of the applet is required to know which credentials from the database 118 to apply to the applet 306.

Figure 7:
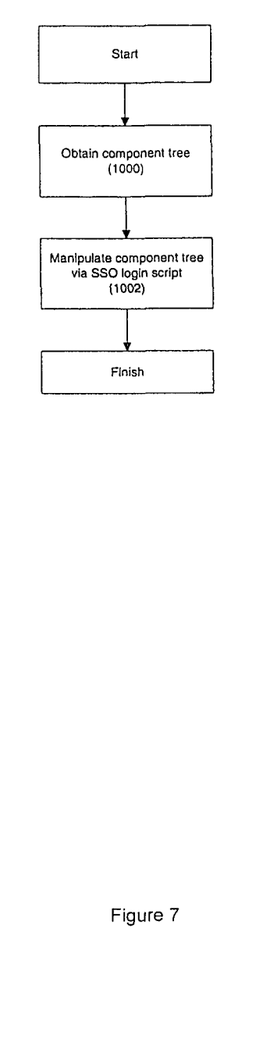
FIG. 7 is a flow chart illustrating the process whereby a component tree is obtained and manipulated.

After the attribute data is dispatched to the applet 306, the SSO Hook 400 is able to pass the authentication credentials to the applet 306 and thereby affect sign on to the resource. This process is described with reference to FIG. 7. The SSO Hook at step 1000 obtains a component tree from the attribute data. The component tree is obtained by querying the Virtual Machine 304 in a manner familiar to those skilled in the art. At step 1002 the component tree is manipulated by the SSO System Scripting Engine 408. Manipulation of the component tree of a graphical user interface window by an SSO Scripting Engine actually carries out the sign on and thus enables access to the relevant resource. This again is a process familiar to those skilled in the art and will not be further detailed here. It should be appreciated that the invention fines convenient use in relation to both Java application programs and applets. In the case of a Java application program 314, as opposed to an applet, it has been found that the process described is broadly applicable. The primary difference is that instead of using the thread group and URL to determine the class file name, the Accessibility API is used to retrieve similar information.

Several benefits arise from the computer program code and method of the present invention in comparison to the programs and methods of the prior art. Principally, the computer program code and method allow Single Sign On systems to be used to access resources provided processes running on a virtual machine. Additionally, the computer program code and method allow communication with processes running on a virtual machine for other purposes, for example for testing virtual machine processes.

It is to be understood that the above embodiments have been provided only by way of exemplification of this invention, and that further modifications and improvements thereto, as would be apparent to persons skilled in the relevant art, are deemed to fall within the broad scope and ambit of the present invention defined in the following claims.

We claim:

1. A computer system, comprising:
   a computer workstation having an operating system installed thereon and having a virtual machine running under the operating system;
   a server communicatively coupled to the workstation;
   a process having instructions that define a user interface when executed on the virtual machine;
   a database of authentication credentials accessible to and stored on the computer workstation;
   a component for registering a single sign-on hook with an accessibility application programming interface in the virtual machine;
   wherein the accessibility application programming interface obtains user interface state data from the process;
   wherein the accessibility application programming interface notifies the single sign-on hook of the user interface state data;
   wherein the single sign-on hook examines the user interface state data to determine whether a log-in opportunity of the process is detected based on the notification, and wherein the examining include a plurality of attributes of the user interface state data; and
   wherein upon the log-in opportunity being detected, queries the virtual machine to obtain component data related to the user interface state data and manipulates the component data to deliver authentication credentials from the database of authentication credentials to the log-in opportunity of the process, wherein attribute data is used to obtain proper authentication credentials from the database.

2. The computer system claimed in claim 1, wherein the process comprises an applet stored at the server, the applet includes the instructions to define a user interface.

3. The computer system claimed in claim 2, wherein the computer system further includes a browser installed on said computer workstation that downloads the applet from the server and run the applet on the virtual machine.

4. The computer system claimed in claim 1, wherein the process comprises an application which includes the instructions to define a user interface.

5. A method for delivering external data to a process running on a virtual machine running on an operating system of a computer workstation, comprising:
   registering a single sign-on hook with an accessibility application programming interface in the virtual machine;
   obtaining, by the accessibility application programming interface, user interface state data from the process;
   notifying, by the accessibility application programming interface, the single sign-on hook of the user interface state data;
   examining, by the single sign-on hook, the user interface state data to determine whether a log-in opportunity of the process is detected based on the notification, wherein the examining include a plurality of attributes of the user interface state data; and
   upon the log-in opportunity being detected, querying the virtual machine to obtain component data related to the state data and manipulating, using the component running on the virtual machine, the component data to deliver the external data to the log-in opportunity of the process, wherein the process calls out an external process to retrieve information carried by the external data and wherein the component data includes a database of authentication credentials that are stored on the computer workstation and wherein attribute data is used to obtain proper authentication credentials from the database.

6. The method of claim 5 wherein, the information carried by the external data includes a login script or authentication credentials.

7. The method of claim 6, wherein, in order to retrieve correct information, code running within the virtual machine determines a unique identifier for identifying the process running in the virtual machine.

8. The method of claim 7, wherein the unique identifier for identifying the process running in the virtual machine is selected from one of:

a class name of a window, a thread group of the window, textual information provided by an accessibility applications program interface (API) about the window, and a title of the window.

9. The method of claim 5, wherein the process implements a user interface and the state data is user interface state data.

10. The method of claim 9, wherein the user interface is a graphical user interface (GUI) and the user interface state data indicates creation of a window in the GUI.

11. The method of claim 5, wherein the process is either an applet or an application.

12. A computer system, comprising:
- a computer workstation having an operating system installed thereon and having a virtual machine running under the operating system;
- a server communicatively coupled to the workstation;
- a process having instructions that define a user interface when executed on the virtual machine;
- a component for registering a single sign-on hook with an accessibility application programming interface in the virtual machine;
- wherein the accessibility application programming interface obtains user interface state data from the process;
- wherein the accessibility application programming interface notifies the single sign-on hook of the user interface state data;
- wherein the single sign-on hook examines the user interface state data to determine whether a log-in opportunity of the process is detected based on the notification, and wherein the examining include a plurality of attributes of the user interface state data; and
- wherein upon the log-in opportunity being detected, queries the virtual machine to obtain component data related to the user interface state data and manipulates the component data stored on the computer workstation so as to deliver authentication credentials to the log-in opportunity of the process, wherein attribute data is used to obtain proper authentication credentials for the log-in opportunity.

13. The computer system claimed in claim 3, wherein the applet includes instructions for presenting an object in the user interface that prompts a user of the workstation to authenticate themselves to a resource provided by the server, the virtual machine instructions automatically delivering the authentication credentials to the object to effect the authentication.

* * * * *